United States Patent Office 2,768,744
Patented Oct. 30, 1956

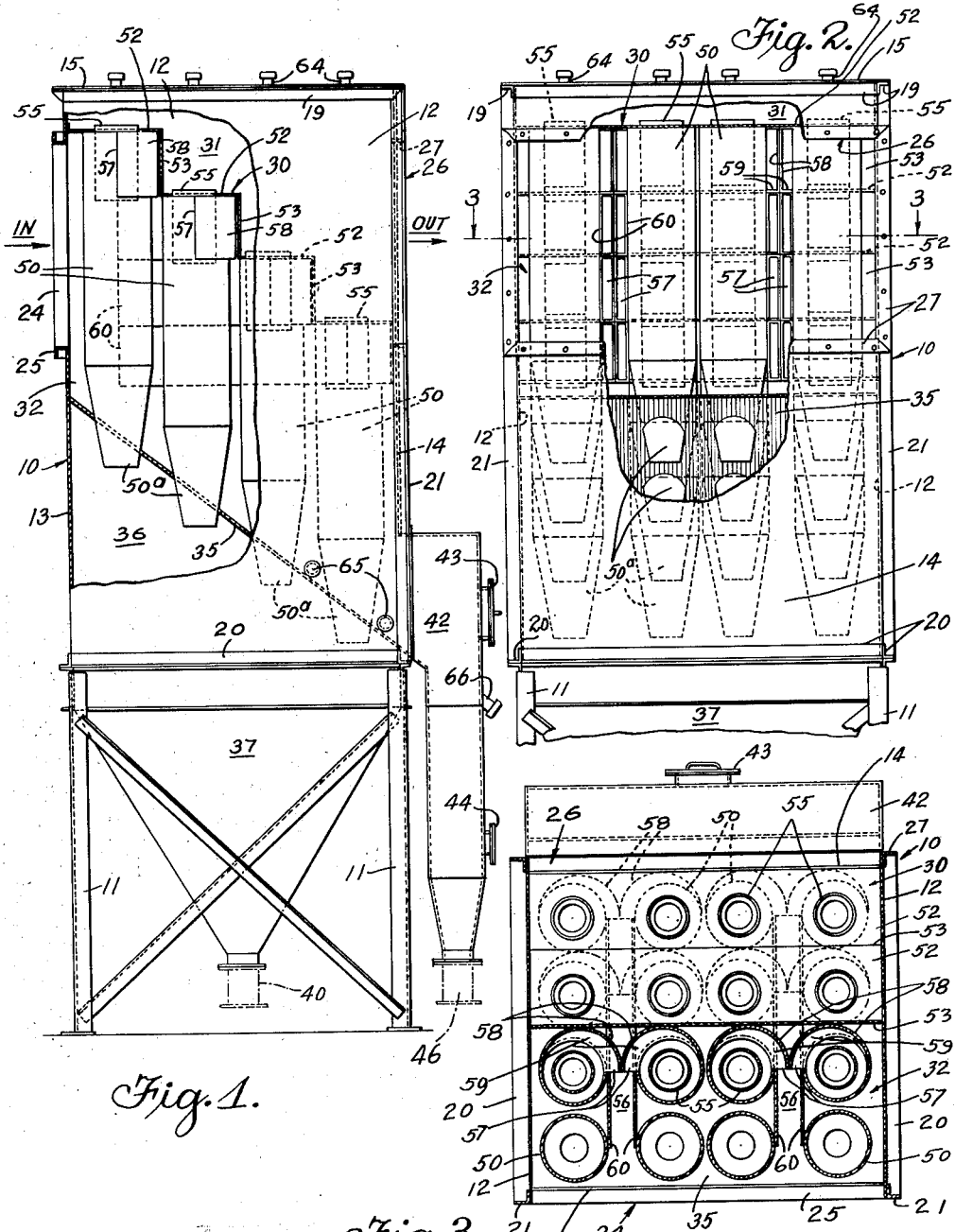

2,768,744

MULTIPLE ELEMENT CYCLONIC SEPARATOR

Norman M. McGrane, Long Beach, Calif., assignor to Western Precipitation Corporation, Los Angeles, Calif., a corporation of California Application March 16, 1953, Serial No. 342,653

8 Claims. (Cl. 209—144)

This invention relates to means for treating gaseous fluids for the separation of suspended material therefrom, and more particularly relates to improvements in a device of this character incorporating multiple cyclonic elements.

It is well known that a cyclonic element of relatively small diameter is more efficient than a large diameter element and will remove from a stream of gas suspended particles too small for separation in the larger diameter element. It follows that a plurality of small diameter cyclonic elements used to treat a large gas stream should have the same higher level of efficiency. Certain difficulties, however, commonly prevent attainment of the theoretical efficiency.

One problem is to obtain substantially uniform effective pressure differentials across all the various cyclonic separator elements with substantially the same inlet pressures at all the individual elements. An important object of the invention, therefore, is to provide a separator incorporating a bank of small diameter cyclonic elements arranged to obtain uniform distribution of the incoming gas stream among the separator elements and high efficiency in each element.

Broadly described, the invention attains its objects by employing a housing enclosing a plurality of cyclonic elements in the form of separating tubes positioned in an inlet chamber opposite a front gas inlet of the housing with the successively rearward tubes in the chamber at successively lower levels along the path of inflowing gas. The transverse top wall of the inlet chamber drops progressively in the direction of entering gas flow to lower levels at the successive separating tubes. Each separating tube has an axial outlet tube extending out of the separating tube through this transverse top wall into an outlet chamber that communicates with the gas outlet of the housing. The transverse top wall of the inlet chamber, which may either slope uniformly downward or step downward by stages to the levels of the successive tubes, not only separates the gas inlet chamber from the gas outlet chamber, but also preferably supports the outlet tubes and the upper ends of the separating tubes. In addition, the transverse top wall cooperates with the separating tubes to form efficient involute inlets into the upper ends of the separating tubes.

Equalizing pressures at the inlets of the separating tubes requires minimizing resistance to gas flow through the inlet chamber so that the gas may move freely and equally to all the separating tubes. A feature of the invention in this respect is that minimum resistance to gas flow through the inlet chamber is achieved by arranging the separating tubes in rows extending in the direction of entering gas flow and spaced apart to form between two rows a rearwardly extending gas passage. There may be several such passages. A further feature is the provision of involute inlets for the separating tubes with the involute walls of the inlets extending into one of the rearwardly extending gas passages to guide gas into the tubes. Also a feature of the preferred embodiment of the invention is the provision of straight side walls for at least a part of the gas passage to minimize the turbulence and eddying therein.

The preferred embodiment of the invention includes a hopper space below the inlet chamber to receive material from the open bottom ends of the separating tubes. As will be explained, a further feature of the invention is the concept of using an auxiliary hopper communicating with only the inlet chamber to receive a coarse fraction of gas-entrained material, thus achieving a certain degree of classification of the separated material.

In this description the gas inlet side of the housing is referred to as the front and the opposite side, usually the outlet side, as the back for convenient reference with respect to the direction of gas flow. In other places, parts are described as "upper" or "lower" and the like. These and all other directional terms in the description are not intended to be necessarily limitative upon the invention.

The features and advantages of the invention will be readily understood from the following detailed description considered with the accompanying drawings.

In the drawings, which are to be regarded as illustrative:

Fig. 1 is a side elevation of a presently preferred embodiment of the invention with a portion of the side wall of the housing broken away;

Fig. 2 is a fragmentary front elevation with a portion of the front wall of the housing broken away;

Fig. 3 is a horizontal section taken as indicated by line 3—3 of Fig. 2;

Figures 4, 5:
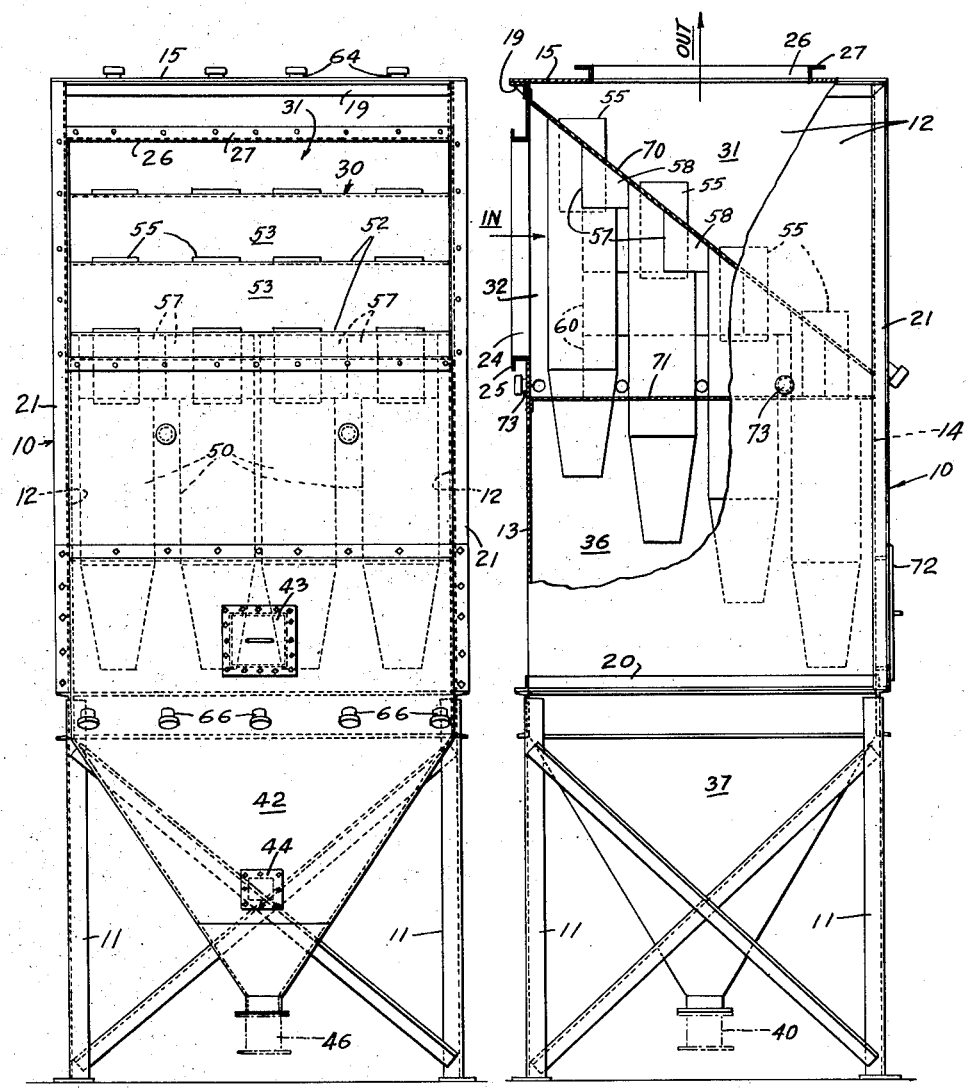
Fig. 4 is a rear elevation.
Fig. 5 is a side elevation similar to Fig. 1 of a second embodiment of the invention.

It will be apparent to those skilled in the art that the principles of the invention may be embodied in structures of various configurations. The particular embodiment shown in Figs. 1 to 4 comprises a rectangular housing generally designated at 10 mounted on an angle iron framework that includes four legs 11. The housing may be made of metal sheets forming two spaced side walls 12, a front wall 13, a rear wall 14, and a top wall 15. The sheets forming these walls may be interconnected and reinforced by horizontal angles 19 and 20 at the top and the bottom of the housing respectively, and vertical angles 21 at the corners.

The housing 10 has a rectangular gas inlet opening 24 in the front wall 13, surrounded by an angle iron frame 25 to which suitable ductwork (not shown) may be connected. A similar rectangular gas outlet opening 26 in the rear wall 14 is surrounded by an angle iron frame 27. Outlet 26 may exhaust to the atmosphere or a gas duct (not shown) may be connected to flange 27. A feature of the preferred embodiment of my invention is that the gas inlet 24 and the gas outlet 26 may be at the same level and in alignment with each other, as shown. Alternatively, outlet 26 may be in top wall 15, as in Fig. 5.

Inside the housing 10, a transverse wall 30, which may be made of steel plate, separates the gas inlet 24 from the gas outlet 26 and, with the housing, defines an outlet chamber 31 in communication with the gas outlet 26. The transverse wall 30 is commonly referred to as a "tube sheet" and is also the top wall of inlet chamber 32 that extends downwardly and rearwardly from the gas inlet 24 between side walls 12 to the rear wall 14 of the housing. A second and lower transverse wall 35, also commonly referred to as a "tube sheet," forms the bottom of the inlet chamber 32 and separates the inlet chamber from hopper space 36. The hopper space 36 is beneath lower transverse wall 35 between side walls 12 and front wall 13, and extends downwardly into hopper 37 which may lead to a suitable discharge duct and may be provided with a suitable dust discharge valve 40.

In this first embodiment of the invention, the lower transverse wall 35 slopes downward so that any particles deposited thereon will gravitate into a rear or auxiliary hopper generally designated 42. The rear hopper 42, which may have an access opening closed by a door 43 and a cleanout opening closed by a door 44, is closed at its lower end by a suitable dust discharge valve 46.

A plurality of cyclonic dust-separating elements in the form of separating tubes 50 are located within housing 10, and more particularly are located chiefly in the inlet chamber 32. Each separating tube has a conically tapered lower portion 50a. Tubes 50 are shown as having their axes vertical, or substantially so, as this is a preferred arrangement, but the invention is not necessarily limited to a vertical position of the tube axes. The separating tubes 50 are open at the upper ends to receive gas and the particles suspended therein from the inlet chamber 32 and are arranged in a plurality of longitudinal rows which extend across the inlet chamber parallel to the direction of flow of the gas stream entering housing 10 through inlet 24 with the successively rearward tubes in each row positioned at successively lower levels. Thus the upper ends of the separating tubes 50 at the front of the inlet chamber 32 adjacent inlet 24 are near the top level of the gas inlet opening 24 and the upper ends of the rearmost tubes are at or near the bottom level of the gas inlet opening. By this arrangement, the successive tube inlets intercept successively lower levels of the inflowing gas stream, as will be explained further.

Upper transverse wall 30, forming the top of the inlet chamber 32, extends rearwardly and downwardly from the top of the gas inlet 24 to accord with the successive levels of the separating tubes 50 and preferably steps down to each level. Thus the transverse wall has a plurality of horizontal portions 52 disposed at successively lower levels, alternating with a plurality of vertical portions 53 connecting successive horizontal portions.

In the particular form illustrated in the drawings, there are sixteen separating tubes 50 in the inlet chamber 32 arranged in four parallel longitudinal rows extending from the front to the rear of the housing. The tubes are also conveniently arranged in four transverse rows extending from side to side. The upper ends of the separating tubes 50 are preferably supported by the step-shaped transverse wall 30, there being one transverse row of four tubes supported by each horizontal portion 52 of the wall.

Near their lower ends the separating tubes 50 extend through the lower transverse wall 35 into hopper space 36. Each tube is open at its lower end to discharge separated particles into the hopper space, the particles settling into hopper 37. Each of the separating tubes has a short co-axial outlet tube 55 that extends upwardly through the upper transverse wall 30 to communicate with the outlet chamber 31. The cleaned gas leaves the separating tubes through these outlet tubes.

The upper ends of the separating tubes 50 are constructed and arranged to form the required gas inlets and to impart a spinning motion to the gas as it enters each tube to form a downwardly moving vortex. The longitudinal rows of separating tubes are spaced apart to form rearwardly extending gas passages that permit the inflowing gas to reach the rearward tubes. In the particular construction shown, the four longitudinal rows of separating tubes 50 are arranged in two pairs, the two rows of each pair being spaced apart to form between the two rows a rearwardly or longitudinally extending passage 56 of sufficient width for the required freedom of gas flow between the tubes from the front to the rear of the inlet chamber.

The above description applies to four or any even number of longitudinal rows of tubes 50. If there is an odd number, then it is necessary to duplicate one-half of a gas passage 56 to supply the tubes in the odd row, which is then spaced from an adjoining row by only one-half the distance required for a full width passage 56. Other changes necessary will be obvious from the description herein.

Each of the separating tubes 50 has a forwardly facing gas inlet of the involute type, as shown at 57 in Fig. 3 for the second tube in each longitudinal row. Each involute inlet is formed by a vertically extending, horizontally curved, spiral wall 58 that blends tangentially into the upper end of the wall of the separating tube. The involute inlet passage is further defined by an adjacent portion of the transverse wall 30 which provides a top to the involute passage, and by bottom wall 59. Thus, when the wall 30 is of stepped construction as shown, each horizontal portion 52 extends across the upper end of the corresponding separating tube of each longitudinal row, around the outlet tube 55, and forms the top wall of the involute inlet 57. As may be seen in Fig. 3, the forward ends of the deflecting walls 58 of each pair of separating tubes 50 lying one at each side of a longitudinal gas passage 56 meet in the middle of the gas passage to divide inflowing gas between the two separating tubes.

Preferably, each of the longitudinal gas passages 56 at the level of the second and succeeding tubes of each longitudinal row is provided with a pair of side walls 60 formed by flat, smooth plates mounted on the outside of the separating tubes. These side plates extend rearwardly from about the center of the front tubes to the involute inlets of the successive tubes in each row. Side walls 60 may be made from single sheets or they may conveniently be made in sections of varying length in the direction of gas flow, each section being equal in height to the vertical dimension of the involute inlets 57. Such wall sections abut each other along their top and bottom edges to eliminate openings through which the gas could pass to leave passage 56. With four tubes in a longitudinal row, there are only three such sections to each side wall 60 (see Fig. 1) since no plate is required at the involute inlet of the first tube of each row because the walls of the two front tubes provide the only means required to define the sides of gas passage 56 at this level. For each successive tube in the direction of gas flow, the distance of gas flow in passage 56 is successively longer, as may be seen in Fig. 1. Gas passages 56 are open at their lower sides to prevent accumulation of solid particles in the passages. Thus there is defined a longitudinal gas passage extending between two adjacent but spaced longitudinal rows of tubes through which gas flows to reach the inlets 57 of the individual tubes. Involute inlets 57 abut one another as shown in Fig. 2 and are of the same size so that gas entering a passage 56 is divided evenly between the several inlets to the individual tubes.

The housing may be provided with suitable rodding holes to permit the insertion of a rod or air lance at various points for the purpose of dislodging accumulated solid material. In the present construction for this purpose pipe nipples are mounted on the walls of the housing 10 at openings in the housing walls, the nipples being normally closed by suitable caps. Thus, a plurality of nipples 64 are mounted on the top wall 15 of the housing for access to the various outlet tubes 55; other nipples 65 are mounted on one or both of the side walls 12 of the housing for access to the upper surface of the lower transverse wall 35; and, finally, a series of nipples 66 are mounted on the rear wall of the rear hopper 42 in upwardly inclined positions for additional access just above the lower transverse wall 35.

The operation of the described multiple tube cyclonic separator may be understood from the foregoing description. The particle-laden gas stream enters the gas inlet 24 of the housing and is substantially equally divided into smaller streams that flow through longitudinal gas passages 56; and the smaller streams are in turn substantially equally divided between the involute inlets 57 of the tubes at each side of a passage 56. A certain amount of the heavier suspended materials may drop out of the gas stream in the course of flow through inlet chamber 31, and the material so separated will fall on to the lower transverse wall 35. The transverse wall 35 slopes downward so that the separated material deposited thereon tends to slide down the wall and into the rear hopper 42.

The material-laden gas entering the involute inlet of each of the separating tubes 50 forms a vortex around the outlet tube 55. The gas spirals downwardly and then turns and spirals upwardly in a smaller vortex through the outlet tube. The particles of solid material suspended in the gas are separated by centrifugal action from the spiral and gravitate or are carried by the downward spiral through the open lower end of the separating tube into the hopper space 36. The separated particles are collected in hopper 37 and are removed as may be required through dust valve 40. The clean gas discharged through the various outlet tubes 55 reaches the outlet chamber 31 and is exhausted through gas outlet 26.

The fact that the incoming gas reaches all of the separating tubes 50 with substantially the same freedom, and the further fact that all of the separating tubes 50 are of equal length and all of the outlet tubes 55 also are of equal length, make for uniformity of distribution of the gas stream among the several separating tubes.

There is a tendency for some particles that are larger or denser to settle out of the gas stream in the inlet chamber. This heavier fraction can be collected separately in hopper 42, if it is desired to keep this fraction separate. The remainder of the suspended particles, primarily the smaller or lighter ones but including larger ones remaining in suspension, are separated in tubes 50 and collected separately in hopper 37. Thus the preferred form of my invention may perform a limited classification of the collected material.

The second embodiment of the invention shown in Fig. 5 is largely similar to the first described embodiment, except as specifically noted. Similar reference numerals designate similar parts. In this second embodiment of the invention, the upper transverse wall 30 is replaced by a transverse wall 70 that serves the same purpose but is a flat sheet that is uniformly sloped rearwardly and downwardly, instead of stepping downward by stages to successive levels. The previously described sloping lower transverse wall 35 is replaced by a transverse wall 71 that is substantially horizontal. Wall 71 accordingly intersects each tube of a longitudinal row at a different position along the tube and passes just below the inlet of the rearmost separating tube. The previously described rear hopper 42 is omitted and the rear wall of the housing is instead provided with an access opening closed by a door 72. This variational form illustrates how the outlet 26 may be placed in the top wall of the housing.

This second embodiment of the invention operates in the same general manner as the first described embodiment, but there is no classifying of the collected particles. All solid particles that drop out in the inlet chamber 32 settle onto the horizontal top surface transverse wall 71 and are for the most part then blown by the gas stream into the rearmost tubes 50. After passing through the rearmost separating tubes 50, these heavier particles are collected in hopper space 36 along with all other particles. A certain amount of material may accumulate in dead spaces on the horizontal transverse wall 71, but the amount is small and limited by the tendency to be swept into the rearmost separating tubes. Periodically, any accumulated material on the transverse wall 71 may be broken up by rods introduced through nipples 73 in the front wall and the two side walls of the housing. The cleaned gas flows in the manner heretofore described upward through the outlet tubes 55 and through the outlet chamber 31a to the gas outlet 26.

My description in specific detail of preferred embodiments of the invention will suggest to those skilled in the arts various changes, substitutions, and other departures from the disclosure that properly lie within the spirit and scope of the appended claims. For example, it may be desired to use a stepped upper transverse wall 30 in conjunction with a horizontal lower transverse wall 71 as this combination reduces the vertical height of inlet chamber 32 toward the rear of the housing. This is advantageous as it helps maintain desired gas velocity at the inlet to the rear tubes. Hence it is to be understood that the foregoing description is considered as being illustrative of, rather than limitative upon, the appended claims.

I claim:

1. Apparatus for separating suspended particles from a stream of gas by centrifugal action, comprising: a housing having a front gas inlet and a gas outlet; a transverse wall in said housing cooperating therewith to define inside the housing an inlet chamber communicating with said gas inlet and an outlet chamber communicating with said gas outlet, said wall extending rearwardly and downwardly across successively lower levels of the path of gas flowing into the housing through said inlet; a pair of longitudinal rows of separating tubes having their upper ends closed by said wall, each row comprising a plurality of separating tubes and the successively rearward tubes being at successively lower levels along the path of inflowing gas, said rows of tubes being laterally spaced to permit the inflowing gas to pass between the forward tubes to reach the more rearward tubes, said tubes having forwardly facing involute inlets at said upper end communicating with said inlet chamber to receive gas therefrom; and a corresponding plurality of outlet tubes in communication with said outlet chamber, each of said outlet tubes extending from the corresponding separating tube through said wall; said transverse wall extending across the ends of the separating tubes and around the outlet tubes to form the top wall of said involute inlets.

2. Apparatus as set forth in claim 1 in which said transverse wall steps down to successive levels within the range of levels of said gas inlet and includes a plurality of horizontal portions disposed at successively lower levels corresponding to the levels of successive tubes and extending across the upper ends of the corresponding separating tubes around the outlet tubes, so as to close the upper ends of the separating tubes and cooperate therewith to form said forwardly facing inlets of the separating tubes.

3. Apparatus as set forth in claim 1 in which said transverse wall is inclined downward and rearwardly and extends across the upper ends of the separating tubes around the outlet tubes, so as to close the upper ends of the separating tubes and cooperate therewith to form said forwardly facing inlets of the separating tubes.

4. Apparatus for separating suspended particles from a stream of gas by centrifugal action, comprising: a housing having a front gas inlet and a gas outlet; wall means forming a transverse wall in said housing cooperating therewith to define inside the housing an inlet chamber communicating with said gas inlet and an outlet chamber communicating with said gas outlet, said wall means including a plurality of substantially horizontal portions disposed at successively lower levels in the path of gas flowing into the housing through said inlet; a plurality of longitudinal rows of separating tubes each comprising a plurality of separating tubes with successively rearward tubes being at successively lower levels along the path of inflowing gas, said rows of tubes being arranged in pairs of laterally spaced rows to permit the inflowing gas to pass between the forward tubes in a pair of rows to reach the more rearward tubes in said pair of rows, said tubes having forwardly facing inlets at said upper end communicating with said inlet chamber to receive gas therefrom said tubes and inlets being closed at their upper ends by horizontal portions of said wall means extending transversely across a plurality of rows of tubes; and a corresponding plurality of outlet tubes in communication with said outlet chamber, each of said outlet tubes extending from the corresponding separating tube through said wall.

5. Apparatus as set forth in claim 4 which includes vertical wall members adjacent the laterally spaced rows of separating tubes and beneath the horizontal portions of the transverse wall means, said vertical wall members extending rearwardly from the front separating tube of a row to the inlets of other separating tubes of a row and in cooperation with said transverse wall means forming longitudinal passages for rearward gas flow from said inlet chamber to the separating tubes rearward of the front separating tubes.

6. Apparatus for separating suspended particles from a stream of gas by centrifugal action, comprising: a housing having a front gas inlet and a gas outlet; a first transverse wall in said housing cooperating therewith to define inside the housing an inlet chamber communicating with said gas inlet and an outlet chamber communicating with said gas outlet, said wall extending rearwardly and downwardly across successively lower levels of the path of gas flowing into the housing through said inlet; a pair of longitudinal rows of separating tubes having their upper ends adjacent said wall, each row comprising a plurality of separating tubes and the successively rearward tubes being at successively lower levels along the path of inflowing gas, said rows of tubes being laterally spaced to permit the inflowing gas to pass between the forward tubes to reach the more rearward tubes, said tubes having forwardly facing inlets at said upper end communicating with said inlet chamber to receive gas therefrom; a corresponding plurality of outlet tubes in communication with said outlet chamber, each of said outlet tubes extending from the corresponding separating tube through said first transverse wall; a second transverse wall in said housing below the first transverse wall closing the underside of said inlet chamber; a first hopper means cooperating with the second transverse wall to form a hopper space communicating with the lower ends of the separating tubes and receiving material from said tubes; said hopper means discharging material from said hopper space; and a second hopper means for the collection and discharge of material from said inlet chamber.

7. Apparatus as set forth in claim 6 in which said second transverse wall slopes downwardly from front to rear for the gravitation of material to said second hopper means.

8. Apparatus as set forth in claim 7 which also includes vertical wall members adjacent the laterally spaced rows of separating tubes, said vertical wall members extending rearward from the forward separating tubes to the inlets of the other separating tubes and in cooperation with the first transverse wall forming longitudinal gas passages for rearward flow of gas from said inlet to the separating tubes rearward of the forward separating tubes, said vertical wall members having their lower edges spaced above said second transverse wall, and said longitudinal gas passages being open at their lower sides.

References Cited in the file of this patent

UNITED STATES PATENTS

| | | |
|---|---|---|
| 2,321,691 | Allardice | Aug. 24, 1943 |
| 2,372,514 | Pootjes | Mar. 27, 1945 |
| 2,433,774 | Madely | Dec. 30, 1947 |
| 2,439,850 | Heller | Apr. 20, 1948 |
| 2,498,832 | Watson et al. | Feb. 28, 1950 |

FOREIGN PATENTS

| | | |
|---|---|---|
| 379,989 | Italy | Apr. 15, 1940 |
| 821,910 | Germany | Nov. 22, 1951 |
| 1,021,374 | France | Dec. 3, 1952 |